US010013004B2

United States Patent
Mathew et al.

(10) Patent No.: US 10,013,004 B2
(45) Date of Patent: Jul. 3, 2018

(54) SYSTEMS AND METHODS FOR MEASUREMENT OF INPUT CURRENT OF VOLTAGE REGULATOR

(71) Applicant: Dell Products L.P., Round Rock, TX (US)

(72) Inventors: Abey K. Mathew, Georgetown, TX (US); Shiguo Luo, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 746 days.

(21) Appl. No.: 14/523,623

(22) Filed: Oct. 24, 2014

(65) Prior Publication Data
US 2016/0116549 A1    Apr. 28, 2016

(51) Int. Cl.
| | | |
|---|---|---|
| G01R 31/40 | (2014.01) |
| G01R 21/00 | (2006.01) |
| G05F 1/10 | (2006.01) |
| G06F 1/28 | (2006.01) |
| G06F 1/30 | (2006.01) |
| H02M 3/158 | (2006.01) |
| H02M 1/00 | (2006.01) |

(52) U.S. Cl.
CPC .................. *G05F 1/10* (2013.01); *G06F 1/28* (2013.01); *G06F 1/30* (2013.01); *H02M 3/1584* (2013.01); *H02M 2001/0009* (2013.01)

(58) Field of Classification Search
CPC .................. G05F 1/10; H02M 3/1584; H02M 2001/0009; G06F 1/30; G06F 1/28
See application file for complete search history.

(56) References Cited

U.S. PATENT DOCUMENTS

| | | | | |
|---|---|---|---|---|
| 2008/0001553 A1* | 1/2008 | Qiu | ...................... | H02M 3/1588 |
| | | | | 315/307 |
| 2010/0052611 A1* | 3/2010 | Lyle, Jr. | ................. | H02M 3/156 |
| | | | | 320/111 |
| 2012/0176114 A1* | 7/2012 | Yamadaya | .............. | H02J 1/102 |
| | | | | 323/311 |

(Continued)

OTHER PUBLICATIONS

Power equation, Application Guide Power Equation, 2012, p. 1-2.*
MicrowPower, Power equations, 2010.*

*Primary Examiner* — John Breene
*Assistant Examiner* — Mohammad Islam
(74) *Attorney, Agent, or Firm* — Jackson Walker L.L.P.

(57) ABSTRACT

In accordance with embodiments of the present disclosure, an information handling system may include an information handling resource, a voltage regulator, a non-transitory computer-readable medium, and a controller. The voltage regulator may be coupled to the information handling resource and configured to deliver electrical energy to the information handling resource. The a non-transitory computer-readable medium may have stored thereon curve fit information, the curve fit information including coefficients of a polynomial for approximating a parameter indicative of the power efficiency of the voltage regulator as a function of a measured output current of the voltage regulator. The controller may be coupled to the voltage regulator and configured to receive information indicative of an output power of the voltage regulator and, based on the information indicative of an output power of the voltage regulator and the curve fit information, calculate an input current of the voltage regulator.

20 Claims, 7 Drawing Sheets

(56) References Cited

U.S. PATENT DOCUMENTS

| | | | |
|---|---|---|---|
| 2012/0194151 A1* | 8/2012 | Gunther | G05F 1/56 323/282 |
| 2013/0088081 A1* | 4/2013 | Siri | H02J 3/383 307/46 |
| 2013/0093251 A1* | 4/2013 | Kondo | H02M 3/1584 307/82 |
| 2013/0207630 A1* | 8/2013 | Rahardjo | H02M 3/156 323/283 |
| 2015/0331435 A1* | 11/2015 | Mac | G05F 1/625 700/298 |

* cited by examiner

| VENDOR ID | FIRST SET | | | | SECOND SET | | | |
|---|---|---|---|---|---|---|---|---|
| | a | b | c | d | a | b | c | d |
| 0 | $a_{0a}$ | $b_{0a}$ | $c_{0a}$ | $d_{0a}$ | $a_{0b}$ | $b_{0b}$ | $c_{0c}$ | $d_{0b}$ |
| 1 | $a_{1a}$ | $b_{1a}$ | $c_{1a}$ | $d_{1a}$ | $a_{1b}$ | $b_{1b}$ | $c_{1c}$ | $d_{1b}$ |
| 2 | $a_{2a}$ | $b_{2a}$ | $c_{2a}$ | $d_{2a}$ | $a_{2b}$ | $b_{2b}$ | $c_{2c}$ | $d_{2b}$ |
| 3 | $a_{3a}$ | $b_{3a}$ | $c_{3a}$ | $d_{3a}$ | $a_{3b}$ | $b_{3b}$ | $c_{3c}$ | $d_{3b}$ |
| ⋮ | ⋮ | | | | ⋮ | | | |
| N | $a_{na}$ | $b_{na}$ | $c_{na}$ | $d_{na}$ | $a_{nb}$ | $b_{nb}$ | $c_{nc}$ | $d_{nb}$ |

SYSTEMS AND METHODS FOR MEASUREMENT OF INPUT CURRENT OF VOLTAGE REGULATOR

TECHNICAL FIELD

The present disclosure relates in general to information handling systems, and more particularly to sensing an input current associated with a voltage regulator in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a voltage regulator to provide a constant voltage level and a current to power the system. For example, a voltage regulator may receive an input voltage and produce an output current at a predetermined output voltage required by a load, i.e., the circuit element(s) for which it is providing power. Moreover, modern information handling systems may include components that maintain current requirements across a broad range from relatively high peak currents to very low stable currents. More particularly, voltage regulators may be required to maintain a high efficiency, or low power loss, over such ranges. In particular, a direct current to direct current (DC-DC) voltage regulator may include a controller, one or more drivers, and one or more power stages. Furthermore, a power stage may include one or more metal oxide-semiconductor-field-effect-transistors (MOSFETs), which may be driven by the drivers.

Additionally, some voltage regulators may be capable of operating in multiple phases. To this end, the concept of a phase for a voltage regulator may typically refer to combining an inductor and a power stage to form one phase. A power stage (which may also be known as a Pstage) may comprise a high-side MOSFET and a low-side MOSFET each driven by a driver. In some embodiments, a power stage may be fully integrated into a single integrated circuit, known as an integrated power stage.

A multi-phase voltage regulator may include multiple instances of such phases. Alternatively, a multi-phase voltage regulator may be thought of as a combination of single phase voltage regulators. For example, a multi-phase voltage regulator may include a plurality of single phase voltage regulators coupled in parallel to provide varying ranges of output current. During periods of high loads, the multi-phase voltage regulator may function with all phases in operation. In contrast, for lower loads, it may employ phase-shedding and operate with a reduced number of phases.

To manage power delivery and consumption by voltage regulators, power control systems in information handling systems often execute power management algorithms. For such power management algorithms to effectively manage power, accurate power, current, voltage, and/or other measurements must be obtained. An inherent conflict in obtaining power measurements is that measurement circuitry itself may add power losses to a system.

SUMMARY

In accordance with the teachings of the present disclosure, the disadvantages and problems associated with input current sensing in a voltage regulator have been reduced or eliminated.

In accordance with embodiments of the present disclosure, an information handling system may include an information handling resource, a voltage regulator, a non-transitory computer-readable medium, and a controller. The voltage regulator may be coupled to the information handling resource and configured to deliver electrical energy to the information handling resource. The a non-transitory computer-readable medium may have stored thereon curve fit information, the curve fit information including coefficients of a polynomial for approximating a parameter indicative of the power efficiency of the voltage regulator as a function of a measured output current of the voltage regulator. The controller may be coupled to the voltage regulator and configured to receive information indicative of an output power of the voltage regulator and, based on the information indicative of an output power of the voltage regulator and the curve fit information, calculate an input current of the voltage regulator.

In accordance with these and other embodiments of the present disclosure, a method may include receiving information indicative of an output power of a voltage regulator. The method may also include, based on the information indicative of an output power of the voltage regulator and curve fit information, calculating an input current of the voltage regulator, wherein the curve fit information includes coefficients of a polynomial for approximating a parameter indicative of the power efficiency of the voltage regulator as a function of a measured output current of the voltage regulator.

In accordance with these and other embodiments of the present disclosure, a power system may include a voltage regulator, a non-transitory computer-readable medium, and a controller. The voltage regulator may be configured to deliver electrical energy to a load. The non-transitory computer-readable medium may have stored thereon curve fit information, the curve fit information including coefficients of a polynomial for approximating a parameter indicative of the power efficiency of the voltage regulator as a function of a measured output current of the voltage regulator. The controller may be coupled to the voltage regulator and configured to receive information indicative of an output power of the voltage regulator and, based on the information indicative of an output power of the voltage regulator and the curve fit information, calculate an input current of the voltage regulator.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

Figure 1:
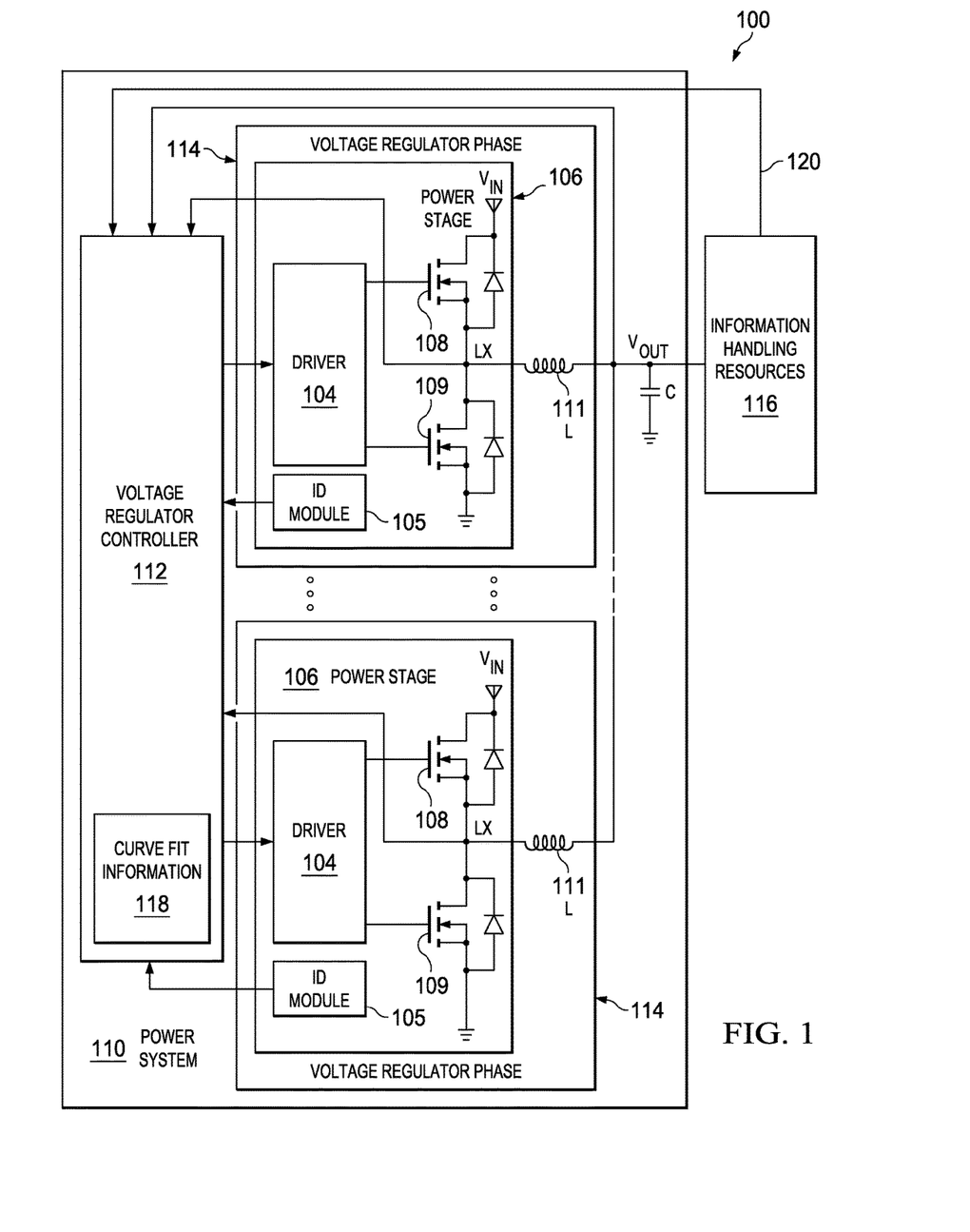
FIG. 1 illustrates a block diagram of an example of an information handling system, in accordance with embodiments of the present disclosure.

FIG. 1 illustrates a block diagram of an example of an information handling system 100 incorporating a power system 110 in accordance with an embodiment of the present disclosure. As depicted, information handling system 100 may include a power system 110, one or more other information handling resources 116, and at least one communication bus.

Generally speaking, power system 110 may include any system, device, or apparatus configured to supply electrical current to one or more information handling resources 116. Power system 110 may include a voltage regulator controller 112 and a plurality of voltage regulator phases 114. In some embodiments, power system 110 may include a multi-phase voltage regulator.

Voltage regulator controller 112 may include any system, device, or apparatus configured to control the output of power system 110 and/or selectively enable and disable voltage regulator phases. Although FIG. 1 depicts voltage regulator controller 112 as being integral to power system 110, in some embodiments, some or all of the structure and/or functionality of voltage regulator controller 112 may be integral to another information handling resource 116 of information handling system 100. For example, in some embodiments, some of the structure and/or functionality of voltage regulator controller 112 may be integral to a remote access controller, such as a Dell Remote Access Controller (DRAC) or Integrated Dell Remote Access Controller (iDRAC).

A voltage regulator phase 114 may include any system, device, or apparatus configured to supply a portion of the total current output of power system 110. A voltage regulator phase 114 may include a power stage 106 and an output inductor 111.

A power stage 106 (also known as a "Pstage") may comprise a driver 104 (e.g., a MOSFET driver), an ID module 105, a high-side switch 108 and a low-side switch 109. In some embodiments, the components of power stage 106 may be fully integrated in a single integrated circuit package, known as an integrated power stage.

A driver 104 may include a high-side driver and a low-side driver. High-side switch 108 may comprise any suitable switching device (e.g., a metal-oxide-semiconductor field-effect transistor or "MOSFET") located between a positive terminal of a power supply $V_{IN}$ and a load, while low-side switch 109 may comprise any suitable switching device (e.g., a MOSFET) located between the load and a negative terminal of the power supply or ground. A phase node voltage LX may be generated based on the supply voltage $V_{IN}$ and switching of switches 108 and 109 and may also indicate a junction point between high-side switch 108 and low-side switch 109.

An output inductor 111 of a voltage regulator phase 114 may be coupled between phase node LX and the output of the voltage regulator phase 114, which may serve to boost or reduce supply voltage $V_{IN}$ to generate output voltage $V_{OUT}$ such that the voltage regulator phase functions as a direct-current to direct-current voltage converter.

In operation, driver 104 may activate and deactivate high-side switches 108 and low-side switches 109 in response to a switching signal from voltage regulator controller 112. High-side switches 108 and low-side switches 109 may operate in a complementary mode, with one of the high-side switches 108 and low-side switches 109 of each phase activated and one deactivated during steady-state operating conditions. When a high-side switch 108 of a phase is activated and its corresponding low-side switch 109 is deactivated, the input power will charge the inductor 111 and supply a current to information handling resources 116. Conversely, when the low-side switch 109 is activated and the high-side switch 108 is deactivated, the inductor current will be discharged by a freewheeling loop consisting of inductor 111, an output capacitor coupled between $V_{OUT}$ and a ground voltage, and low-side switch 109.

An ID module 105 may include any system, device, or apparatus configured to specify an identity (e.g., source vendor or supplier, model number, lot number, serial number, etc.) of a particular voltage regulator phase 114 or a portion thereof. In some embodiments, an ID module 105 may be similar or identical to a power device identification module such as that described in U.S. patent application Ser. No. 14/470,217, filed Aug. 27, 2014, entitled "Methods and Systems for Calibration of Voltage Regulator Systems with Multiple Types of Power Stages," U.S. Prov. Pat. Appl. Ser. No. 62/014,442, filed on Jun. 19, 2014 entitled "Methods and Systems for Calibration of Voltage Regulator Systems with Multiple Types of Power Stages," and/or U.S. Prov. Pat. Appl. Ser. No. 62/014,478, filed on Jun. 19, 2014 and entitled "Methods and Systems for Implementing Adaptive FET Drive Voltage Optimization for Power Stages of Multi-Phase Voltage Regulator Circuits," each of which is incorporated herein by reference. As described in greater detail below, information set forth in ID module 105 may be used by voltage regulator controller 112 in order to invoke a curve-fit profile of voltage regulator efficiency and/or power loss versus output current of the voltage regulator which is tailored to an identifying characteristic of the voltage regulator (e.g., vendor identifier). By applying a curve-fit profile tailored to a vendor identifier, the error of a curve fit as compared to actual efficiency or power loss data may be less than 0.5%, as compared to an error of up to 1% when the identity of a vendor is not considered.

A communication bus 120 may comprise any suitable communication pathway for communication of information between one or more information handling resources 116 and voltage regulator controller 112. For example, in some embodiments, communication bus 120 may comprise a System V Interface Definition (SVID) bus for communication of information from a processor to voltage regulator controller 112. In such embodiments, the processor may communicate a signal known as a power status indicator to notify voltage regulator controller 112 of its operation mode (e.g., sleep mode, awake mode, etc.), so that voltage regulator controller 112 may appropriately invoke an operation mode suitable for supplying necessary current to the processor for the operation mode of the processor.

Although FIG. 1 depicts two voltage regulator phases 114, power system 110 may include any suitable number of voltage regulator phases 114.

Generally speaking, information handling resources 116 may include any component system, device or apparatus of information handling system 100, including without limitation processors, buses, computer-readable media, input-output devices and/or interfaces, storage resources, network interfaces, motherboards, electro-mechanical devices (e.g., fans), displays, and/or power supplies.

In operation, voltage regulator controller 112 may selectively enable and disable one or more voltage regulator phases 114 in response to an electrical power requirement of information handling resources 116, such that one or more phases may be shed to reduce power consumption of power system 110 in response to the reduced current requirement, and thus increase power efficiency of information handling system 100. Accordingly, voltage regulator controller 112 may control drivers 104 such that the appropriate power stages 106 provide the desired level of power to information handling resources 116.

In addition, voltage regulator controller 112 may be configured to measure a measured output current for each respective voltage regulator phase 114. An integrated power stage may communicate a measured output current and/or a calibrated output current to voltage regulator controller 112 in a real-time manner. For example, voltage regulator controller 112 may measure a voltage across an output inductor 111 of a phase 114 (e.g., the voltage difference between an output voltage VOUT and a voltage present at phase node voltage LX of such phase 114) and determine the measured output current of the phase to be equal to the measured voltage divided by a nominal parasitic impedance of output inductor 111. As another example, a current may be sensed by measuring a drain-to-source resistance of a MOSFET switch of a power stage 106 and calibration may be completed by automated test equipment and/or a calibration algorithm of voltage regulator controller 112.

Figure 2A:
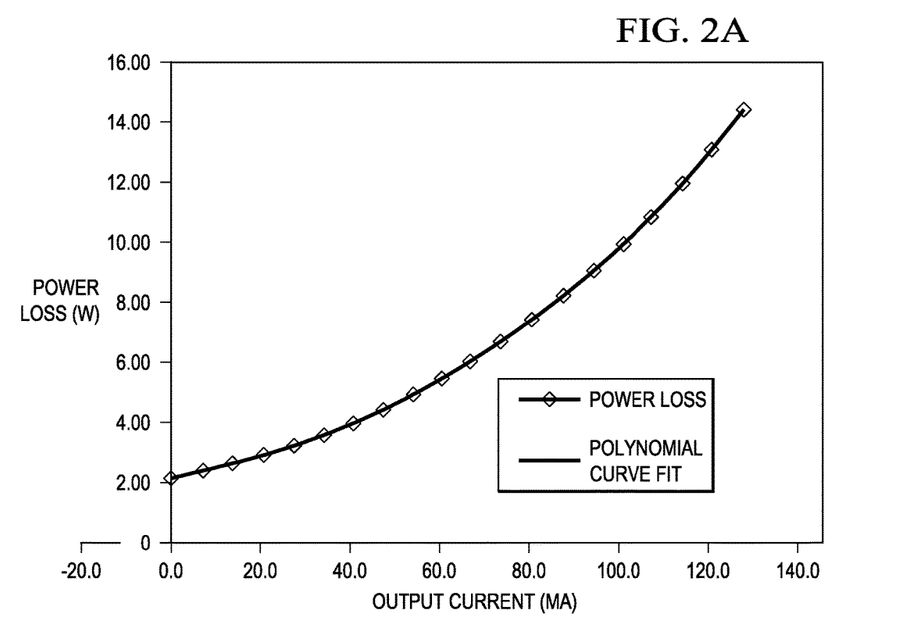
FIG. 2A illustrates an example graph of power loss of a voltage regulator versus measured output current of the voltage regulator, in accordance with embodiments of the present disclosure.
Figure 2B:
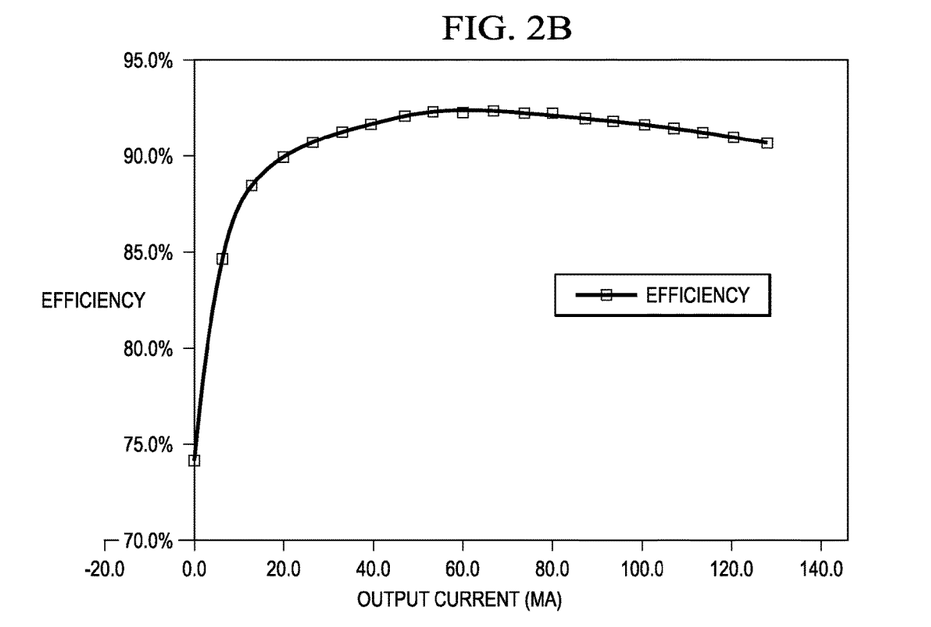
FIG. 2B illustrates an example graph of power efficiency of a voltage regulator versus measured output current of the voltage regulator, in accordance with embodiments of the present disclosure.

From the measured output current of a voltage regulator, voltage regulator controller 112 may be able to calculate an input current to the voltage regulator based on a fitted curve indicative of power efficiency of the voltage regulator. Such calculation could be made on a phase-by-phase basis or on a voltage regulator with all phases in operation. To illustrate, voltage regulator controller 112 may have stored in a computer-readable medium integral or otherwise accessible to voltage regulator controller 112 curve-fit information 118 indicative of power efficiency of a voltage regulator. For example, in some embodiments, curve-fit information 118 may store information indicative of the power loss (e.g., input power minus output power) of a voltage regulator versus measured output current. An example graph of power loss of a voltage regulator versus measured output current is depicted in FIG. 2A. As another example, in some embodiments, curve-fit information 118 may store information indicative of the power efficiency (e.g., output power divided by input power) of a voltage regulator versus measured output current. An example graph of power efficiency of a voltage regulator versus measured output current is depicted in FIG. 2B. In each of the cases shown in FIGS. 2A and 2B, the power loss and the power efficiency as a function of measured output current may be approximated by a polynomial function. For example, a power loss y of a voltage regulator may be approximated by the function $y(x)=ax^3+bx^2+cx+d$, where x is the measured output current and a, b, c, and d are polynomial coefficients. Efficiency may also be approximated by a multiple-order (e.g., $3^{rd}$ order or higher) polynomial equation.

Figure 3:
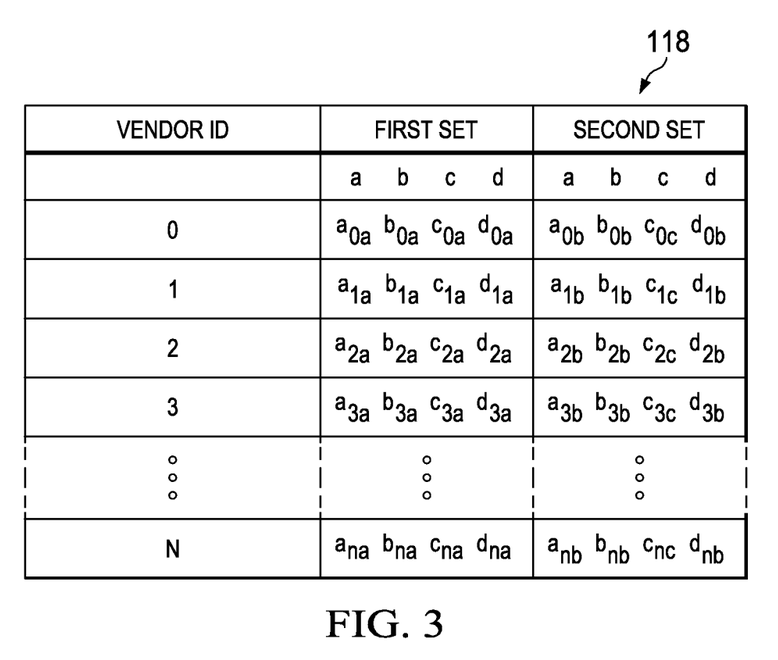
FIG. 3 illustrates example contents of curve fit information, in accordance with embodiments of the present disclosure.

During a characterization operation of a voltage regulator, either during testing prior to delivery to an intended end user and/or during calibration after delivery to an end user, a profile of the efficiency versus measured output current and/or power loss versus measured output current of the voltage regulator may be obtained by testing the voltage regulator over a range of loading conditions (e.g., over a range of measured output currents). Based on the profile obtained, polynomial coefficients of a polynomial equation representing the profile of power loss and/or efficiency may be calculated, estimated, or otherwise determined, and stored as curve fit information 118. FIG. 3 illustrates example contents of curve fit information 118, in accordance with embodiments of the present disclosure.

In some embodiments, a particular profile of the efficiency versus measured output current and/or power loss versus measured output current of the voltage regulator may be approximated by a curve having two or more different polynomial functions depending on the measured output current. For example, a voltage regulator may operate in an autonomous phase shedding mode in which the number of phases in operation may vary as a load current of the voltage regulator varies. In light loading conditions, a voltage regulator may operate in a discontinuous conduction mode (DCM) with only one phase at lower currents and a continuous conduction mode (CCM) with one or more multiple phases 114 at higher currents, and the efficiency or power loss of each mode versus current may be approximated by a different polynomial.

Figure 2C:
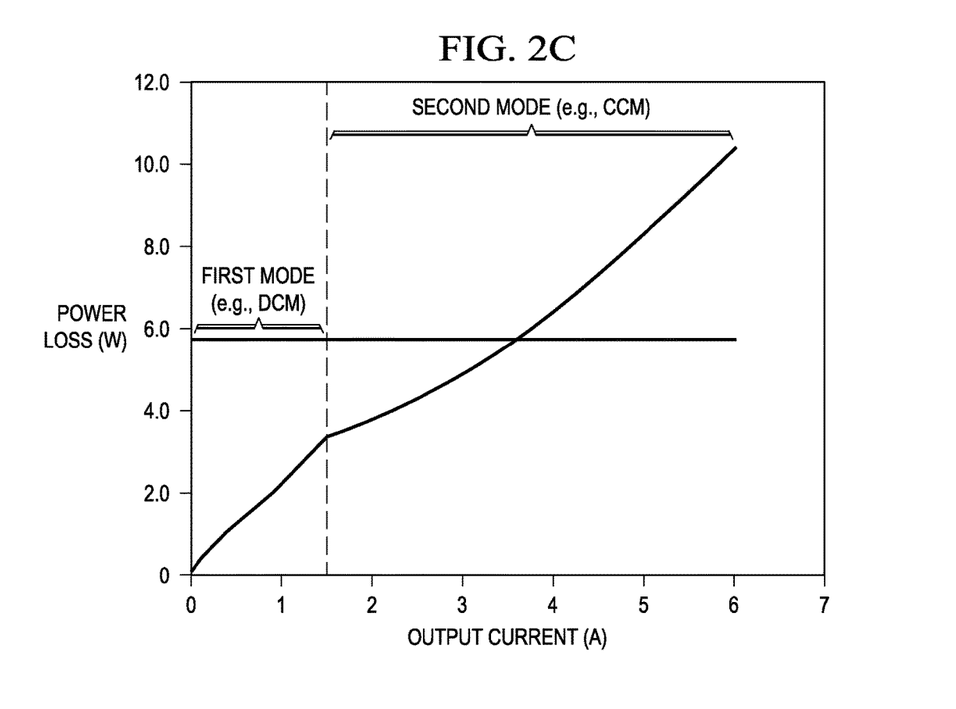
FIG. 2C illustrates an example graph of power loss of a voltage regulator versus measured output current of a voltage regulator wherein curve fit data is applied to two operational mode, in accordance with embodiments of the present disclosure.
Figure 2D:
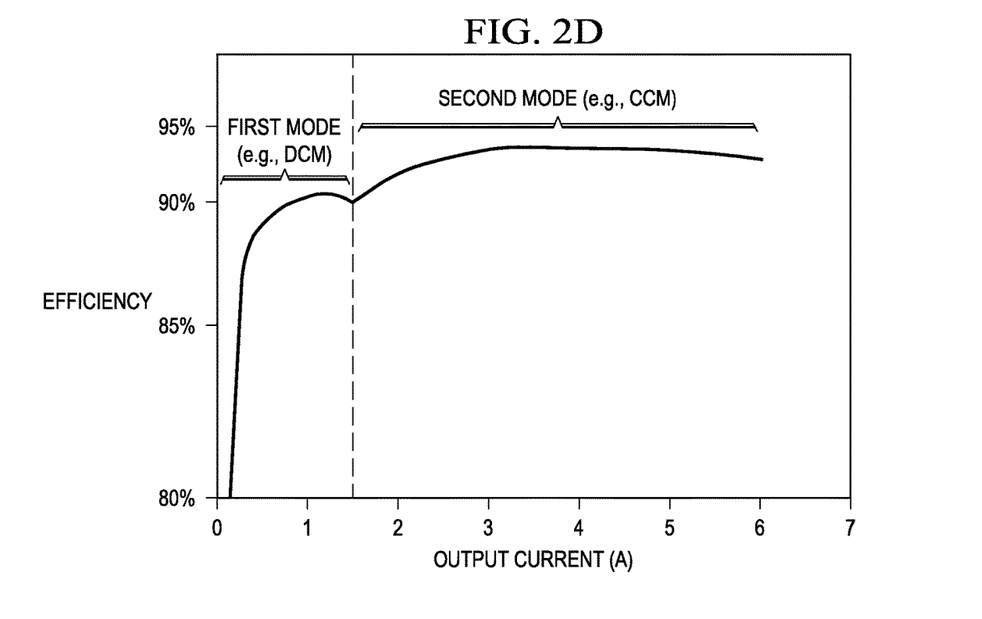
FIG. 2D illustrates an example graph of power efficiency of a voltage regulator versus measured output current of a voltage regulator wherein curve fit data is applied to two operational modes, in accordance with embodiments of the present disclosure.
Figure 2E:
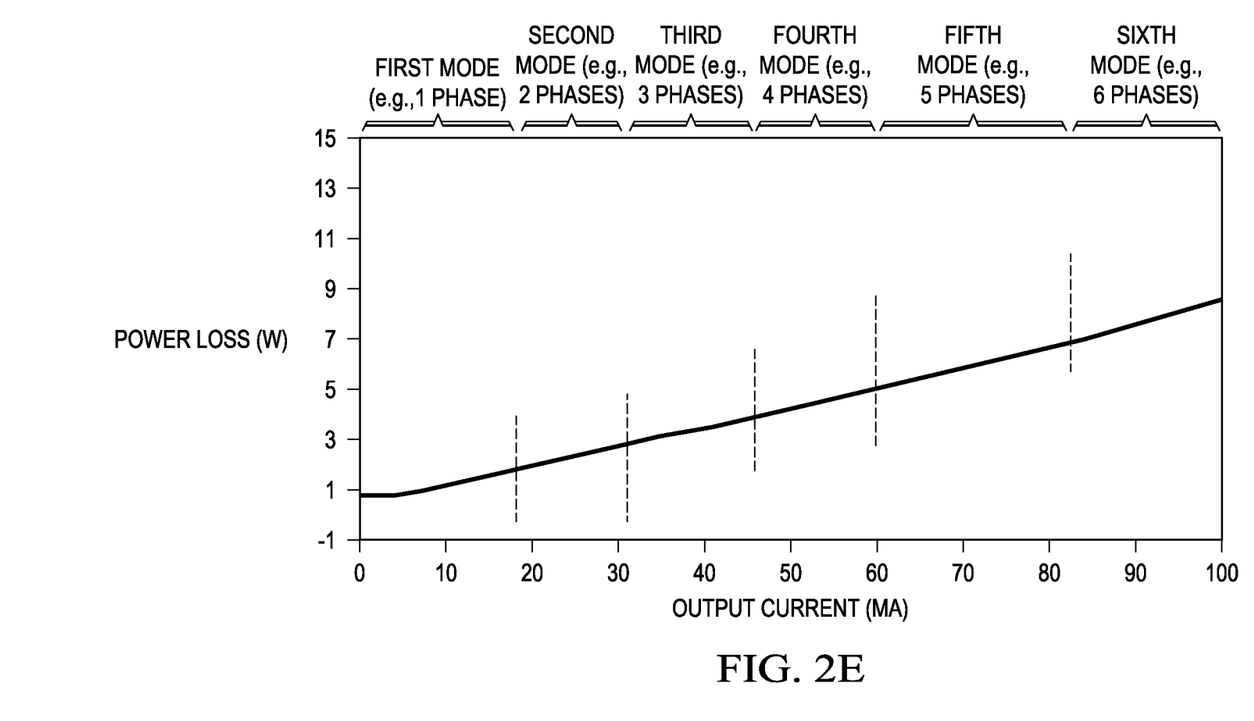
FIG. 2E illustrates an example graph of power loss of a voltage regulator versus measured output current of a voltage regulator wherein curve fit data is applied to multiple operational modes, in accordance with embodiments of the present disclosure.
Figure 2F:
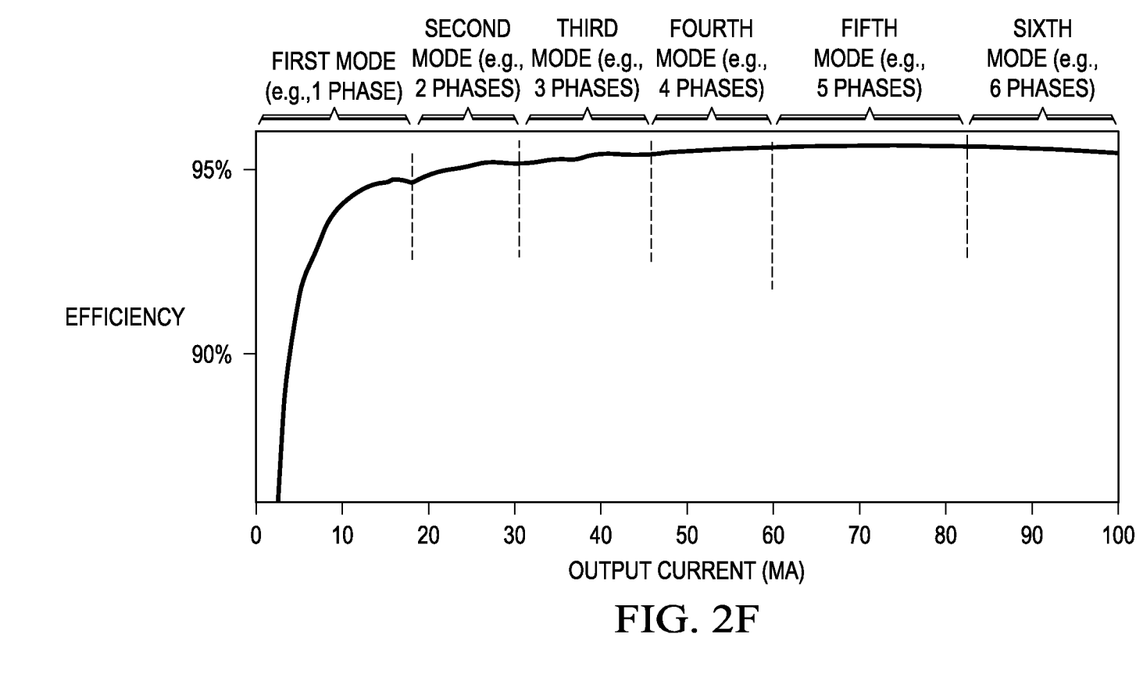
FIG. 2F illustrates an example graph of power efficiency of a voltage regulator versus measured output current of a voltage regulator wherein curve fit data is applied to multiple operational modes, in accordance with embodiments of the present disclosure.

Theoretically, an equivalent circuit may represent each voltage regulator mode of operation in a specific configuration (e.g., number of operational phases), and thus an accurate mathematical expression of power loss and/or efficiency may be obtained by a piece-wise approach which uses two or more equations to express a curve-fit profile. For example, one polynomial equation may be invoked when a voltage regulator is operating in DCM with one phase while another polynomial equation may be invoked when a voltage regulator is operating with multiple phases in CCM, as shown in FIGS. 2C through 2F. FIGS. 2C and 2D depict profiles for two operational modes (e.g., CCM and DCM) of a voltage regulator while FIGS. 2E and 2F depict profiles for more than two operational modes (e.g., CCM, DCM with one phase, DCM with two phases, DCM with three phases, etc.). Accordingly, power loss and/or efficiency data for curve fit information 118 may be obtained by testing different operation modes of a voltage regulator. Thus, curve fit information 118 may store, for a particular voltage regulator, a different set of polynomial coefficients for each different operation modes of a voltage regulator.

In these and other embodiments, curve fit information 118 may be capable of storing multiple entries, each entry having polynomial coefficient information associated with a respective identifier (e.g., vendor identifier) of a power stage 106, as such information may be set forth in an ID module 105 of such power stage 106. For example, each entry of curve fit information 118 may be indexed by identifying which vendors' power stages 106 are used in operating a voltage regulator.

Figure 4:
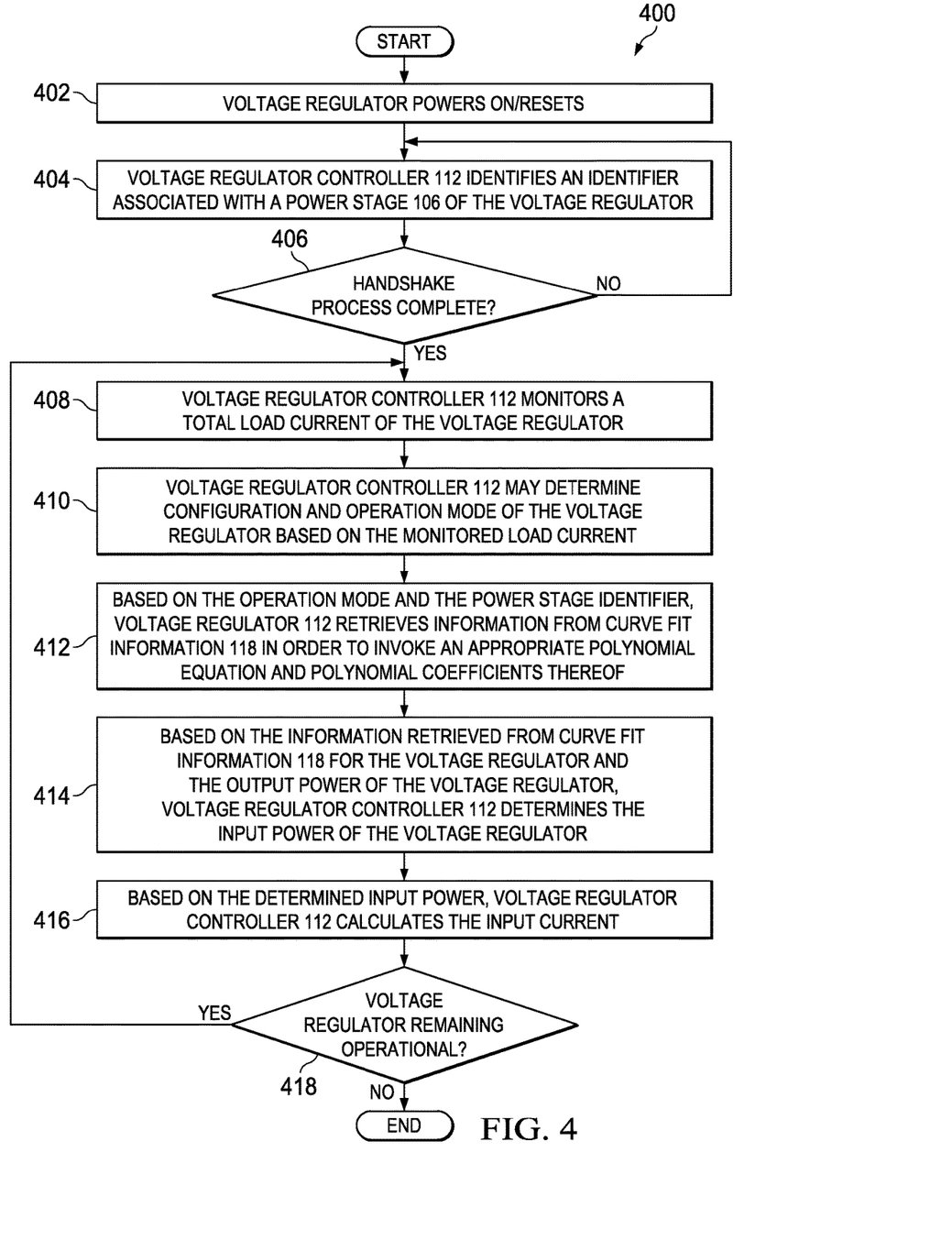
FIG. 4 illustrates a flow chart of an example method for measurement of an input current of a voltage regulator phase, in accordance with embodiments of the present disclosure.

FIG. 4 illustrates a flow chart of an example method 400 for measurement of an input current of a voltage regulator, in accordance with embodiments of the present disclosure. According to one or more embodiments, method 400 may begin at step 402. As noted above, teachings of the present disclosure may be implemented in a variety of configurations of information handling system 100. As such, the preferred initialization point for method 400 and the order of the steps comprising method 400 may depend on the implementation chosen.

At step 402, a voltage regulator may power on or reset. At step 404, voltage regulator controller 112 may identify an identifier (e.g., vendor identifier) associated with a power stage 106 of the voltage regulator. At step 406, voltage regulator controller 112 may determine if a handshake process between voltage regulator controller 112 and a power stage 106 is complete, such that the voltage regulator may begin operation.

At step 408, voltage regulator controller 112 may monitor a total load current of the voltage regulator by receiving information from an integrated power stage current measurement and/or from a measurement of a voltage across a parasitic resistance of the output inductor 111 of each phase.

At step 410, voltage regulator controller 112 may determine an operation mode (e.g., CCM or DCM) and a configuration (e.g., number of operational phases) of the voltage regulator based on the monitored load current. In these and other embodiments, the operation mode may also be determined from information (e.g., a power status indicator of a processor powered by the voltage regulator) communicated via communication bus 120. At step 412, based on an the operation mode and power stage identifier (e.g., vendor identifier), voltage regulator 112 may retrieve information from curve fit information 118 in order to invoke an appropriate polynomial equation and polynomial coefficients thereof.

At step 414, based on the information retrieved from curve fit information 118 for the voltage regulator and the output power of the voltage regulator (which may be calculated by multiplying the measured output voltage by the measured output current), voltage regulator controller 112 may determine the input power of the voltage regulator.

At step 416, based on the determined input power, voltage regulator controller 112 may calculate the input current of the voltage regulator. For example, voltage regulator controller 112 may calculate the input current by dividing the input power by a supply voltage for the voltage regulator.

At step 418, voltage regulator controller 112 may determine if the voltage regulator remains operational. If the voltage regulator remains operating, method 400 may return to step 408. Otherwise, method 400 may end.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 100 or any other system operable to implement method 400. In certain embodiments, method 400 may be implemented partially or fully in software and/or firmware embodied in computer-readable media and executable on a processor of information handling system 100.

The systems and methods disclosed herein may possess one or more advantages over existing approaches to measuring or otherwise determining an input current of a voltage regulator. For example, the systems and methods disclosed herein may negate the need for making an input current measurement using a sense resistor, which may be inaccurate and susceptible to noise, thus potentially improving measurement accuracy. Elimination of a sense resistor may also reduce cost as well as reduce circuit board area needed to perform input current measurement. The approaches of the methods and systems disclosed herein may also be more suitable for newer generation information handling systems, as a voltage regulator controller may be integrated within the same integrated circuit as voltage regulators, further enhancing measurement and calculation capabilities.

The systems and methods disclosed herein may also be capable of accounting for power distribution losses throughout a voltage regulator and distribution losses associated with the network for delivery of power to information handling resources. For example, rather than measuring current at the output of a voltage regulator and using curve fit information to characterize power loss or efficiency at such output, measurement and characterization may instead be made at another point in the power distribution network. As a specific example, with respect to a processor, by measuring output current and characterizing curve fit information for a sense point at the processor (e.g. socket remote sense point), voltage regulator input current may be calculated and take into account overall distribution losses.

In addition, temperature-based variations that impact efficiency and power loss may also be accounted for, as curve-fit data may be collected for and applied to operating temperatures of interest.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
an information handling resource;
a first voltage regulator phase of a first type and a second voltage regulator phase of a second, different type coupled to the information handling resource and configured to deliver electrical energy to the information handling resource;
a non-transitory computer-readable medium having stored thereon curve fit information, the curve fit information including coefficients of first and second polynomials for approximating corresponding first and second parameters indicative of power efficiencies of the first and second voltage regulator phases as a function of respective measured output currents of the first and second voltage regulator phases; and
a controller coupled to the first and second voltage regulator phases and configured to:
receive information indicative of respective output powers of the first and second voltage regulator phases;
based on the information indicative of the respective output powers of the first and second voltage regulator phases and the curve fit information, calculate respective input currents of the first and second voltage regulator phases; and
based on the respective input currents, selectively enable or disable at least one voltage regulator phase of the information handling system.

2. The information handling system of claim 1, wherein the first and second parameters indicate power efficiency in terms of the respective output powers divided by respective input powers of the first and second voltage regulator phases as a function of the respective measured output currents.

3. The information handling system of claim 1, wherein the first and second parameters indicate power loss in terms of respective input powers of the first and second voltage regulator phases minus the respective output powers as a function of measured output current.

4. The information handling system of claim 1, wherein the information indicative of respective output powers includes the respective measured output currents and respective measured output voltages of the first and second voltage regulator phases.

5. The information handling system of claim 1, wherein the controller is further configured to:
receive from the first and second voltage regulator phases identifying information associated with the first and second voltage regulator phases; and
read from the curve fit information respective entries associated with the identifying information.

6. The information handling system of claim 1, wherein the curve fit information includes a first set of polynomial coefficients associated with values of the measured output current below a particular measured output current and a second set of polynomial coefficients associated with values of the measured output current above the particular measured output current.

7. The information handling system of claim 1, wherein the curve fit information includes a first set of polynomial coefficients associated with a first operation mode of the first and second voltage regulator phases and a second set of polynomial coefficients associated with a second operation mode of the first and second voltage regulator phases.

8. A method comprising:
receiving, at an information handling system, information indicative of respective output powers of a first voltage regulator phase of a first type and a second voltage regulator phase of a second, different type;
based on the information indicative of the respective output powers and curve fit information, the information handling system calculating respective input currents of the first and second voltage regulator phases, wherein the curve fit information includes coefficients of first and second polynomials for approximating corresponding first and second parameters indicative of first and second power efficiencies of the first and second voltage regulator phases as a function of respective measured first and second output currents of the voltage regulator phases; and
based on the respective input currents, selectively enable or disable at least one voltage regulator phase of the information handling system.

9. The method of claim 8, wherein the first and second parameters indicate power efficiency in terms of the respective output powers divided by respective input powers of the first and second voltage regulator phases as a function of the respective measured output currents.

10. The method of claim 8, wherein the first and second parameters indicate power loss in terms of respective input powers of the first and second voltage regulator phases minus the respective output power as a function of measured output current.

11. The method of claim 8, wherein the information indicative of respective output powers includes the respective measured output currents and respective measured output voltages of the first and second voltage regulator phases.

12. The method of claim 8, further comprising:
receiving from the first and second voltage regulator phases identifying information associated with the first and second voltage regulator phases; and
reading from the curve fit information respective entries associated with the identifying information.

13. The method of claim 8, wherein the curve fit information stores a first set of polynomial coefficients associated with values of the measured output current below a threshold measured output current and a second set of polynomial coefficients associated with values of the measured output current above the threshold measured output current.

14. The method of claim 8, wherein the curve fit information stores a first set of polynomial coefficients associated with a first operation mode of the first and second voltage regulator phases and a second set of polynomial coefficients associated with a second operation mode of the first and second voltage regulator phases.

15. A power system comprising:
a first voltage regulator phase of a first type and a second voltage regulator phase of a second, different type that are configured to deliver electrical energy to a load;
a non-transitory computer-readable medium having stored thereon curve fit information, the curve fit information including coefficients of first and second polynomials for approximating corresponding first and second parameters indicative of power efficiencies of the first and second voltage regulator phases as a function of respective measured output currents of the first and second voltage regulator phases; and
a controller coupled to the first and second voltage regulator phases and configured to:
receive information indicative of respective output powers of the first and second voltage regulator phases;
based on the information indicative of the respective output powers of the first and second voltage regulator phases and the curve fit information, calculate respective input currents of the first and second voltage regulator phases; and
based on the respective input currents, selectively enable or disable at least one voltage regulator phase of the power system.

16. The power system of claim 15, wherein the first and second parameters indicate power efficiency in terms of the respective output powers divided by respective input powers of the first and second voltage regulator phases as a function of the respective measured output currents.

17. The power system of claim 15, wherein the first and second parameters indicate power loss in terms of respective input powers of the first and second voltage regulator phases minus the respective output powers as a function of measured output current.

18. The power system of claim 15, wherein the information indicative of respective output powers includes the respective measured output currents and respective measured first and second output voltages of the voltage regulator phases.

19. The power system of claim 15, wherein the controller is further configured to:
receive from the first and second voltage regulator phases identifying information associated with the first and second voltage regulator phases; and
read from the curve fit information respective entries associated with the identifying information.

20. The power system of claim 15, wherein the curve fit information includes a first set of polynomial coefficients associated with a first operation mode of the first and second voltage regulator phases and a second set of polynomial coefficients associated with a second operation mode of the first and second voltage regulator phases.

* * * * *